United States Patent
Barnes (10) Patent No.: US 6,623,236 B1
(45) Date of Patent: Sep. 23, 2003

(54) VACUUM APPARATUS AND METHOD FOR DENESTING OBJECTS

(75) Inventor: Raymond M. Barnes, North Andover, MA (US)

(73) Assignee: IPC, Inc., Lincolnshire, IL (US)

(*) Notice: Subject to any disclaimer, the term of this patent is extended or adjusted under 35 U.S.C. 154(b) by 0 days.

(21) Appl. No.: 09/466,683

(22) Filed: Dec. 20, 1999

Related U.S. Application Data (60) Provisional application No. 60/113,396, filed on Dec. 23, 1998.

(51) Int. Cl.[7] ............................................. B65G 59/06
(52) U.S. Cl. ................. 414/795.6; 294/64.1; 414/797.8
(58) Field of Search ..................... 294/64.1; 414/795.5, 414/795.6, 797.8

(56) References Cited

U.S. PATENT DOCUMENTS

| | | | |
|---|---|---|---|
| 3,907,161 A | | 9/1975 | Martin |
| 3,981,407 A | * | 9/1976 | Potts .................... 414/795.5 X |
| 4,106,397 A | | 8/1978 | Amberg et al. |
| 4,135,619 A | | 1/1979 | Cerboni |
| 4,919,587 A | | 4/1990 | Tashiro et al. |
| 4,967,930 A | | 11/1990 | Koltze |
| 5,064,093 A | | 11/1991 | Davis et al. |
| 5,172,922 A | | 12/1992 | Kowaleski |
| 5,688,008 A | | 11/1997 | Hansch |

FOREIGN PATENT DOCUMENTS

| | | | | |
|---|---|---|---|---|
| GB | 2 084 118 | * | 4/1982 | .............. 414/795.5 |
| GB | 2 283 737 | * | 5/1995 | |
| JP | 3-88623 | * | 4/1991 | .............. 414/795.6 |
| JP | 4-72224 | * | 3/1992 | .............. 414/795.5 |

* cited by examiner

Primary Examiner—Janice L. Krizek
(74) Attorney, Agent, or Firm—Weingram & Associates, P.C.

(57) ABSTRACT

A vacuum picker apparatus for cups includes a vacuum picker head with concave surface areas, each being preferably ½° reverse angle, and each surface area having a hole therethrough that allows for a vacuum to be formed at the picker head. When the vacuum is formed, the side wall of the cup is drawn, inside the overall circumference of the head at each concave surface area to provide for an effective seal to hold the cup to the picker head, which reduces deformation of the cup and facilitates its extraction for further processing. A protective ring or skirt at the picker head has spaced apart notches through which apertures are formed to direct a thrust of air against the stack to force the stack away from the individual cup being denested. The dual action of the vacuum picker apparatus removes an individual cup from a stack of cups and forces the stack away from the cup to facilitate removal of the individual cup from the stack.

25 Claims, 10 Drawing Sheets

VACUUM APPARATUS AND METHOD FOR DENESTING OBJECTS

This application is a provisional of 60/113,396 filed Dec. 23, 1998.

BACKGROUND OF THE INVENTION

1. Field of the Invention

The present invention relates to an apparatus employed to remove a fluted cup of lightweight material from a stack of a plurality of similar cups tightly nested together.

2. Description of the Related Art

Apparatus and machines known for fabricating, manipulating and processing fluted cups constructed of paper and other light weight materials are described in the following patents:

| U.S. Pat. No. | Inventor(s) |
| --- | --- |
| 3,907,161 | Martin |
| 4,106,397 | Amberg, et al. |
| 4,135,619 | Cerboni |
| 4,919,587 | Tashiro et al. |
| 4,967,930 | Koltze |
| 5,064,093 | Davis et al. |
| 5,172,922 | Kowaleski et al. |
| 5,688,008 | Hansch |

U.S. Pat. No. 3,907,161 to Martin discloses an apparatus for denesting stacked packaging trays having a suction gripper that moves into engagement with the outer most tray in a stack of trays, moving the outer most tray from the stack through an opening in the magazine that holds the stack.

U.S. Pat. No. 4,106,397 to Amberg et al. discloses a denesting cup having a head formed from a sheet-like plastic material with a plurality of vacuum holes formed in the head to engage the inner portions of the stack.

U.S. Pat. No. 4,135,619 to Cerboni discloses a device for collecting and transferring confectionery products, and which has a series of vacuum heads that pick the confectionery products from a conveyor.

U.S. Pat. No. 4,919,587 to Tashiro et al. discloses a device having a denesting head to remove cups one at a time from a stack of cups and place them on a conveyor.

U.S. Pat. No. 4,967,930 to Koltze discloses a device for separating conical tubes stored in a nested stack by means of two gripping ring assemblies arranged to engage the last tube in the stack and the next to the last tube in the stack, in order to separate the last two.

U.S. Pat. No. 5,064,093 to Davis et al. discloses a device having a plurality of elongated helical screws for separating trays of a plurality of cups.

U.S. Pat. No. 5,172,922 to Kowaleski et al. discloses a self aligning vacuum nozzle used for removing or lifting products in automated assembly operations. A nozzle tip pivots to align with surfaces that are not planar.

U.S. Patent No. 5,668,008 to Hansch discloses a suction device which has a swiveling head for gripping an article, the suction transmitted evenly through the angle of adjustment of the head in order to apply the suction that grips the article.

In food production industries, a fluted cup made from paper or a paper backed foil is used to hold the comestible (food product). The fluted cups are transported to different locations as a stack of a multiplicity of the cups. The cups often arrive at the manufacturing facility tightly nested together as a compacted stack of a multiplicity of individual cups.

The above is a cost-effective way to transport the stacked cups, provides for maintaining the uniform structure of the individual cups, and deters against crushing to which the cups are susceptible during transport. At the food production facility, the stack of nested cups must be separated into discrete units for further processing and into which the food product such as cupcakes or bakery dough, is to be deposited. Machinery is employed to reduce the labor intensive aspect of separating the individual cups from the nested stack prior to filling the cups. However, the known devices discussed above have many disadvantages for accomplishing the task.

First, conventional picker heads which employ suction do not effectively and as quickly separate and remove each individual fluted cup from the stack. Secondly, when they are removed, it is sometimes in groups of two or more, not individually as required. Thirdly, known picker heads deform the fluted cup and in certain instances, bend the cups so that they do not maintain the circular or desired shape that they were shipped in and into which the food product will be disposed. In addition, known picker head devices are constructed to only pull an individual fluted cup from the remaining stack, as opposed to providing a dual action, as in the present invention of pulling an individual cup from the stack and pushing or exerting a force on the stack to separate the stack from the individual cup to be removed.

OBJECTS AND SUMMARY OF THE INVENTION

It is therefore an object of the present invention to provide a vacuum apparatus and method for denesting objects for use with stacks of objects such as paper cups which are tightly packed together.

It is an object of the present invention to provide a vacuum apparatus which is constructed and arranged to reduce the labor intensive aspect of separating individual cups from a nested stack of a multiplicity of cups.

It is another object of the present invention to provide a vacuum apparatus which pulls an individual fluted cup from a stack of a multiplicity of the cups and simultaneously exerts a force on the stack to separate the individual cup from the remaining stack.

It is another object of the present invention to provide a vacuum apparatus which channels the airflow during the vacuum formed to cause the fluted cup to conform to a vacuum head of the apparatus which does not deform the shape of the fluted cup.

It is another object of the present invention to provide a vacuum apparatus which is provided with ejection means to displace a cup at the vacuum picker head of the apparatus for subsequent processing.

It is another object of the present invention to provide a vacuum apparatus having an exterior surface area constructed and arranged to substantially reduce stress exerted on the fluted cup during the vacuum operation.

It is another object of the present invention to provide a vacuum apparatus having a base portion constructed and arranged for supporting an open end of each fluted cup to facilitate the vacuum operation and ejection of the cup from the vacuum apparatus without deforming the structure of the fluted cup.

It is another object of the present invention to provide a vacuum apparatus having a picker head portion with a plurality of depressions for increasing the surface area of the head portion to facilitate a more controlled vacuum effect upon the fluted cup.

It is another object of the present invention to provide a vacuum apparatus having a vacuum picker head coacting with a vacuum guide plate or base plate for control of the vacuum picking of each individual fluted cup from a stack of nested cups.

It is another object of the present invention to provide a vacuum apparatus having a plurality of vacuum picker heads constructed and arranged for coaction with a vacuum guide or base plate upon which a plurality of nested stacks of fluted cups are arranged in registration with the corresponding plurality of vacuum picker heads.

To accomplish the foregoing objects, the vacuum picker apparatus according to the present invention includes a vacuum picker head with concave surface areas, each being preferably ½° reverse angle, and each surface area having a hole therethrough that allows for a vacuum to be formed at the picker head. When the vacuum is formed, the side wall of the fluted cup is actually drawn inside the overall circumference of the head at each concave surface area to provide for an effective seal to hold the cup to the picker head, which reduces deformation of the cup and facilitates its extraction for further processing.

Another feature of the present invention is a protective ring or skirt having spaced apart notches through which apertures are formed to direct a thrust of air in a direction to force an individual cup being denested from the remaining stack of cups.

The dual action of the vacuum picker apparatus of the present invention extracts an individual cup from a stack of cups and directs a blast of air at the stack to facilitate removal of the individual cup from the stack.

BRIEF DESCRIPTION OF THE DRAWINGS

For a more complete understanding of the present invention, reference may be had to the description of the preferred embodiments taken in conjunction with the drawing Figures of which.

DETAILED DESCRIPTION OF THE PREFERRED EMBODIMENTS

Figure 1:
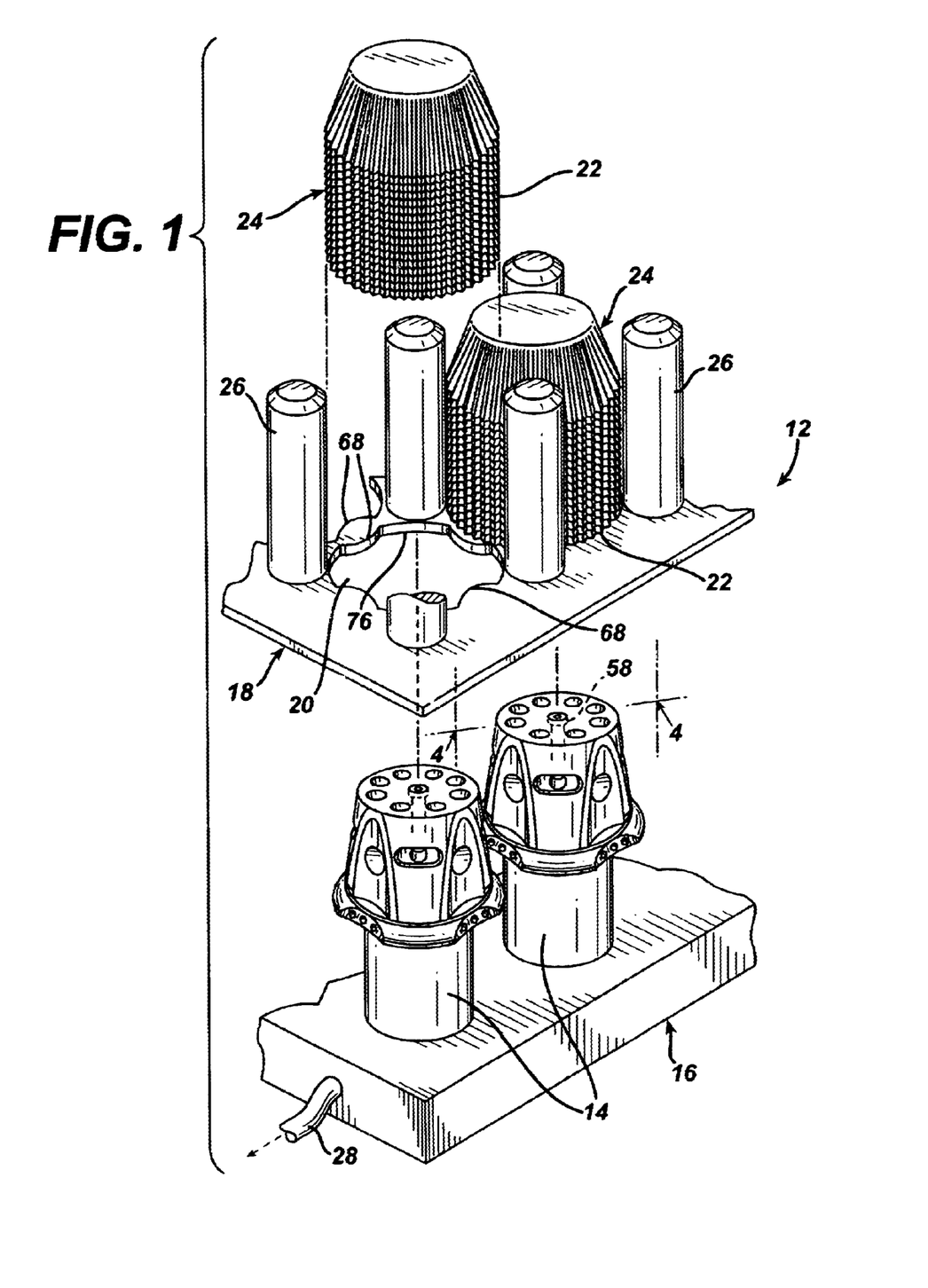
FIG. 1 shows an exploded view of a first embodiment of a vacuum picker apparatus according to the present invention.

Referring to FIG. 1, a vacuum picker apparatus according to the present-invention is shown generally at 12. The apparatus 12 consists of a plurality of vacuum picker heads 14, support plate or platform 16 for the heads 14, and a vacuum guide plate or base plate 18 constructed with feed apertures 20 through which individual fluted cups 22 are removed from a stack 24 of nested fluted cups. The base plate 18 is provided with a plurality of lugs 26 surrounding the feed apertures 20 through which each one of the cups is guided when drawn down onto the corresponding vacuum head 14. The terms vacuum picking and vacuum denesting are used interchangeably.

In FIG. 1, two vacuum picker heads 14 are shown, while it is understood that one or a plurality of vacuum heads can be mounted on the support platform 16 for a denesting operation as will be described hereinafter. The upstanding lugs 26 at the base plate 18 align the nested cups 24 with the feed apertures 20. This enables other machinery (not shown) to quickly and accurately guide the nested cups into position on the base plate 18 for a vacuum denesting operation.

The support plate 16 includes a vacuum hose 28 extending through the support plate 16 for connection to the vacuum heads 14. This arrangement permits the support plate 16 to function as a manifold to which the picker head 14 or a plurality of the vacuum picker heads 14 can be connected for a denesting operation. Air is evacuated through the hose 28 to provide a vacuum in the vicinity of the picker heads as described below. The support plate 16 can be mounted to a transport apparatus (not shown) to transport the plate 16 during a denesting operation.

The vacuum picker head 14 is aligned with the guide plate 18 for registration with a corresponding one of the feed apertures 20, thereby facilitating registration of the vacuum picker head 14 with the corresponding stack 24 of fluted cups nested for a denesting operation. During such operation, as will be discussed in more detail below, the support plate 16 is moved in relation to the base plate 18 to position the vacuum picker head 14 in the corresponding feed aperture 20 of the base plate 18.

Figure 2:
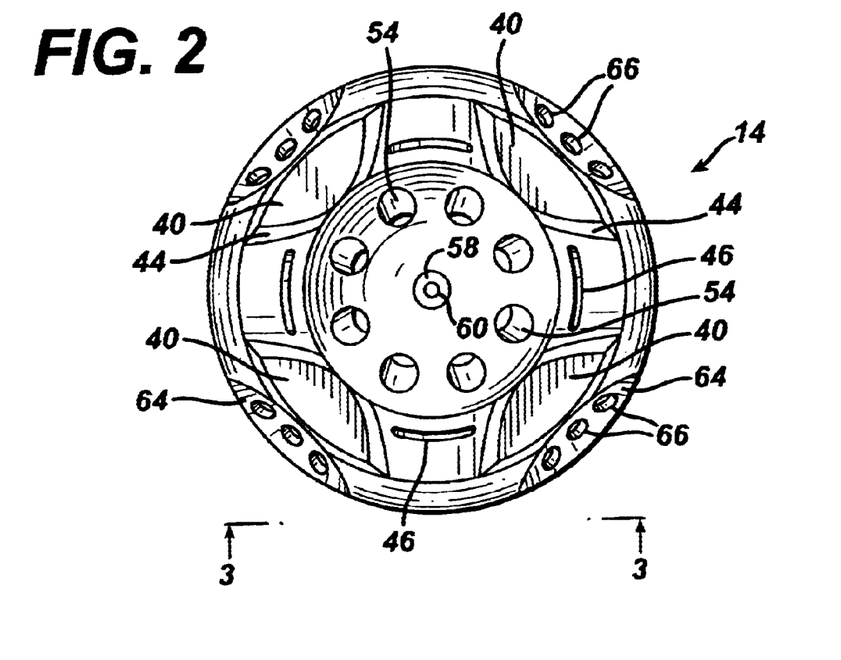
FIG. 2 shows a top plan view of an individual vacuum picker head according to the present invention.
Figure 3:
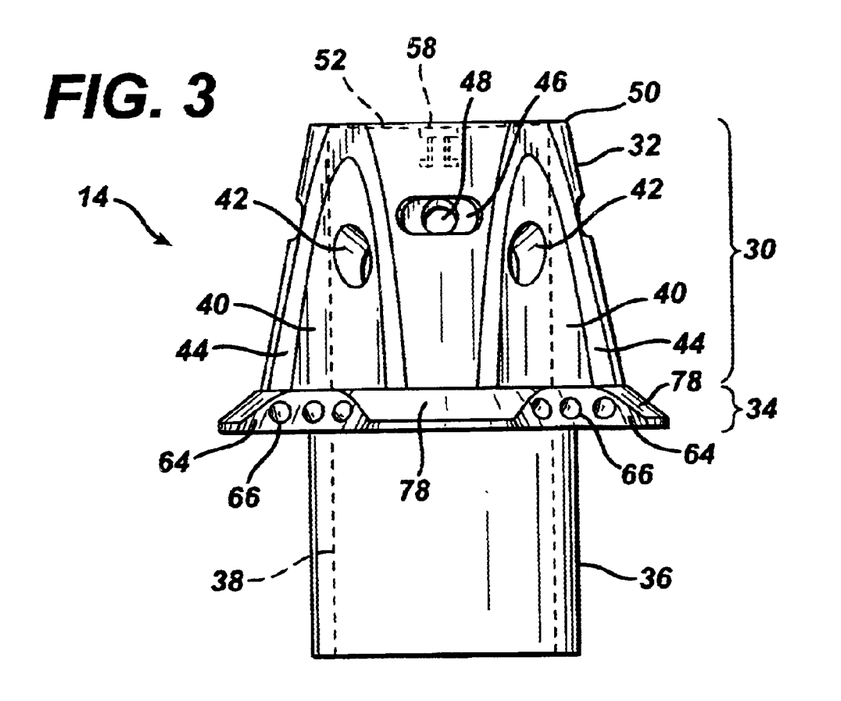
FIG. 3 shows a side elevational view of the vacuum picker head taken along lines 3—3 of FIG. 2.

Referring also to FIGS. 2 and 3, elements of the vacuum picker head 14 are further discussed. It will be understood that while one vacuum picker head 14 is shown, a plurality of vacuum picker heads can be mounted to the support plate 16 to coact with a corresponding plurality of fluted cup stacks 24 arranged on the base plate 18.

The vacuum picker head 14 is machined to conform with the interior dimensions of the fluted cup 22 made from paper or paper backed foil. The design of the picker head 14 can be constructed for use with fluted cups of practically any shape. Each picker head 14 has its own configuration for use with a cup 22 having a corresponding shape. The picker head 14 is constructed so that it will not deform the dimensions or compromise the structural integrity of the fluted cup 22 during a denesting operation.

The picker head 14 is constructed for the vacuum applied at the head 14 and in the vicinity of the cup 22 to effectively hold the cup onto the head so that removal of the cup 22 from the head 14 is similar to peeling the cup 22 from the head 14.

Referring to FIG. 3, the picker head 14 includes an upper portion 30 with a sidewall 32 extending to a protective ring or skirt 34 just below the upper portion 30 of the head 14. A column 36 extends from the ring 34 opposite to the upper portion 30 to support the picker head 14 on the support plate 16. Referring to, FIG. 4, a seal 37 is disposed where the column 36 is joined to the support plate 16 to airtight the joint.

Figure 4:
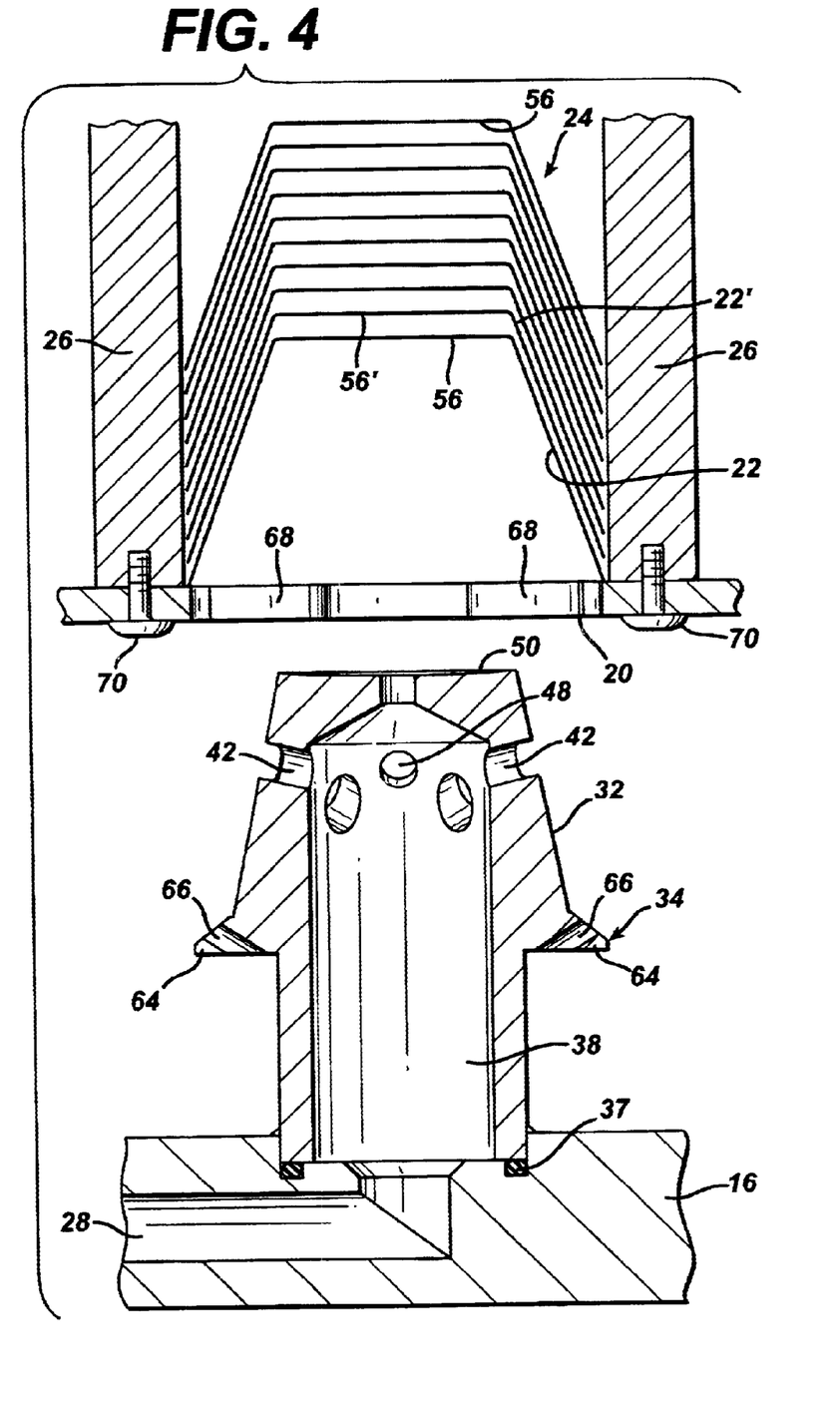
FIG. 4 shows a cross-sectional view of the vacuum picker apparatus according to the present invention taken along lines 4—4 in FIG. 1, with the apparatus ready for a denesting operation.

Referring also to FIG. 4, a central bore shown generally at 38 provides a passage through which air is drawn to create a vacuum at the picker head 14 and at an area at an exterior of the head 14. The central bore 38 is in communication with the vacuum hose 28.

The head 14 is machined with a plurality of concave cut outs, preferably ½° reverse angle, to form regions referred to as flats 40. Each flat region 40 has a corresponding vacuum hole 42 through which a vacuum can be drawn. Each one of the vacuum holes 42 is in communication with the central bore 38 at an interior of the picker head 14. As shown in the Figures, the picker head 14 includes a plurality, preferably four, of the flat regions 40. It is understood that a picker head 14 can be constructed with at least two or more flat regions 40 strategically located on the side wall of the head 14. When the vacuum is formed, the side wall of the fluted cup 22 is pulled to the inside of the overall circumference of the head 14 at the adjacent concave flat 40. The concave flats 40 permit the cup to dimple when being pulled down onto the exterior surface of the sidewall 32 of the head 14, so that the cup is not flattened or bent when it conforms to the shape of the exterior surface of the head 14 under the effect of the vacuum.

A transition surface 44 interconnects each flat region 40 with the sidewall 32 of the head 14. The transition surface 44 immediately surrounding each concave flat 40 is machined flat to reduce the stress on the cup material as it is being pulled against the picker head 14 and bent into the flat 40 under the effect of the vacuum.

The picker head 14 also includes a plurality of elongated, depressed slots 46 extending parallel to the protective ring 34. The slots 46 are formed in the sidewall 32 of the head 14 between adjacent flat regions 40. Each slot 46 contains a vacuum hole 48. The vacuum holes 48 are in communication with the central bore 38. The slots 46 allow for the individual cup to be held more firmly by the head 14 by creating a greater area over which the vacuum takes place at the sidewall 32.

The slots 46 in combination with the respective vacuum holes 48 permit for an increase in suction due to their depressed surface area. This permits a greater volume from which air is to be drawn, thereby increasing the suction over a surface of the elongated slot 46 to help grip the cup 22. This is particularly useful where the fluted cup 22 material is made from heavier stock and requires more force to separate the individual cup 22 from the nested stack 24 and hold the cup 22 to the picker head 14.

A top portion 50 of the picker head 14 is concaved slightly (1° concavity) as shown by the broken line 52 (FIG. 3), and contains a plurality of vacuum holes 54. Although the vacuum holes 54 are arranged in a circle at the top 50 of the picker head 14, this is by way of example only, and other arrangements, can be employed. This construction allows a bottom 56 (FIG. 4) of the cup 22 to be bent slightly inward toward the picker head top 50 during a vacuum, thereby eliminating contact with a bottom 56' of the next cup 22' so nested, and facilitating and urging separation from the next cup 22'.

A knockout button 58 is disposed for deployment at a center of the top 50 of the head 14. The button 58 assists in removing the cup 22 from the head 14 after the cup has been withdrawn from the remaining stack 24 of cups. The button 58 can also be provided with a vacuum hole 60 (FIG. 2) in communication with the central bore 38. During vacuum picking, after an individual cup 22 is removed from the stack 24, the picker head 14 is pivoted 90° from the vertical, as discussed below. This action displaces the automatically actuated knockout button 58 from the concave top 50 to contact the cup bottom 56 and push the cup 22 off the picker head 14 for further processing of the cup 22. This is particularly useful with fluted cups which are of a smaller size and made from lightweight paper material. The cups 22 of lighter weight material sometimes adhere to the picker head 14 until forced therefrom by the button 58.

The protective ring 34 conforms to the shape of the upper portion 30 of the picker head 14 and radiates outward from the sidewall 32. The ring 34 includes a plurality of concave cut outs or notches 64, each one of which is in registration with a corresponding one of the flats 40. Each one of the notches 64 is provided with one or a plurality of apertures 66 for directing air flow through the ring 34 during a denesting operation. The protective ring 34 at the notches 64 supports the apertures 66 in registration with a respective one of the flats 40. The ring 34 provides a protective support for the open ended flared-out portion of each one of the cups 22 as it is being pulled away from the remaining cups nested in the stack 24. The apertures 66 in the notches 64 also direct an instantaneous burst of air to contact a top edge of the next cup 22' in the stack 24 to prevent the cup 22' and those remaining in the stack 24 from interfering with the individual cup 22 being denested or removed from the stack.

FIG. 4 discloses a portion of the base plate 18 having the feed aperture 20 constructed and arranged to receive a corresponding one of the picker heads 14 for movement therein to denest the fluted cups 22.

The base plate 18 is formed at the feed aperture 20 with a plurality of ears 68 extending from the plate 18 inward of the respective aperture 20. Each one of the ears 68 is constructed and arranged with respect to the base plate 18 to coact with a respective one of the notches 64 in the picker head 14. The coaction between the ears 68 and the notches 64 facilitates the vacuum to draw the individual cup 22 down on the picker head 14, and to exert a force to separate the individual cup 22 from the remaining nested stack 24 of cups. Increasing the size of the ears 68 (FIG. 1) that support the stack 24 of cups enables the size of the cups 22 to be increased and to be made with a tighter flair.

The lugs 26 surrounding the feed apertures 20 are preferably attached to the base plate 18 by, for example, mechanical fasteners 70 such as screws. It is understood that other means of fastening the lugs 26 to the base plate 18 can be employed whether of a mechanical or chemical variety.

It is preferred for the vacuum picker head 14 of the present invention to be used with the stack 24 of cups 22 inverted as shown in the FIGS. 1,4–7 and 9. The open end of the fluted cups 22 faces downward so that the picker head 14 extracts the cup 22 from beneath the base plate 18 to benefit from the use of gravity in the vacuum picking operation.

In FIGS. 4–8, a sequence for a vacuum picking operation is shown with the vacuum picker apparatus 12 of the present invention. With respect to FIGS. 5–8, solid line arrows indicate mechanical motion of the apparatus 12, while broken line arrows indicate airflow during a vacuum denesting operation.

Figure 5:
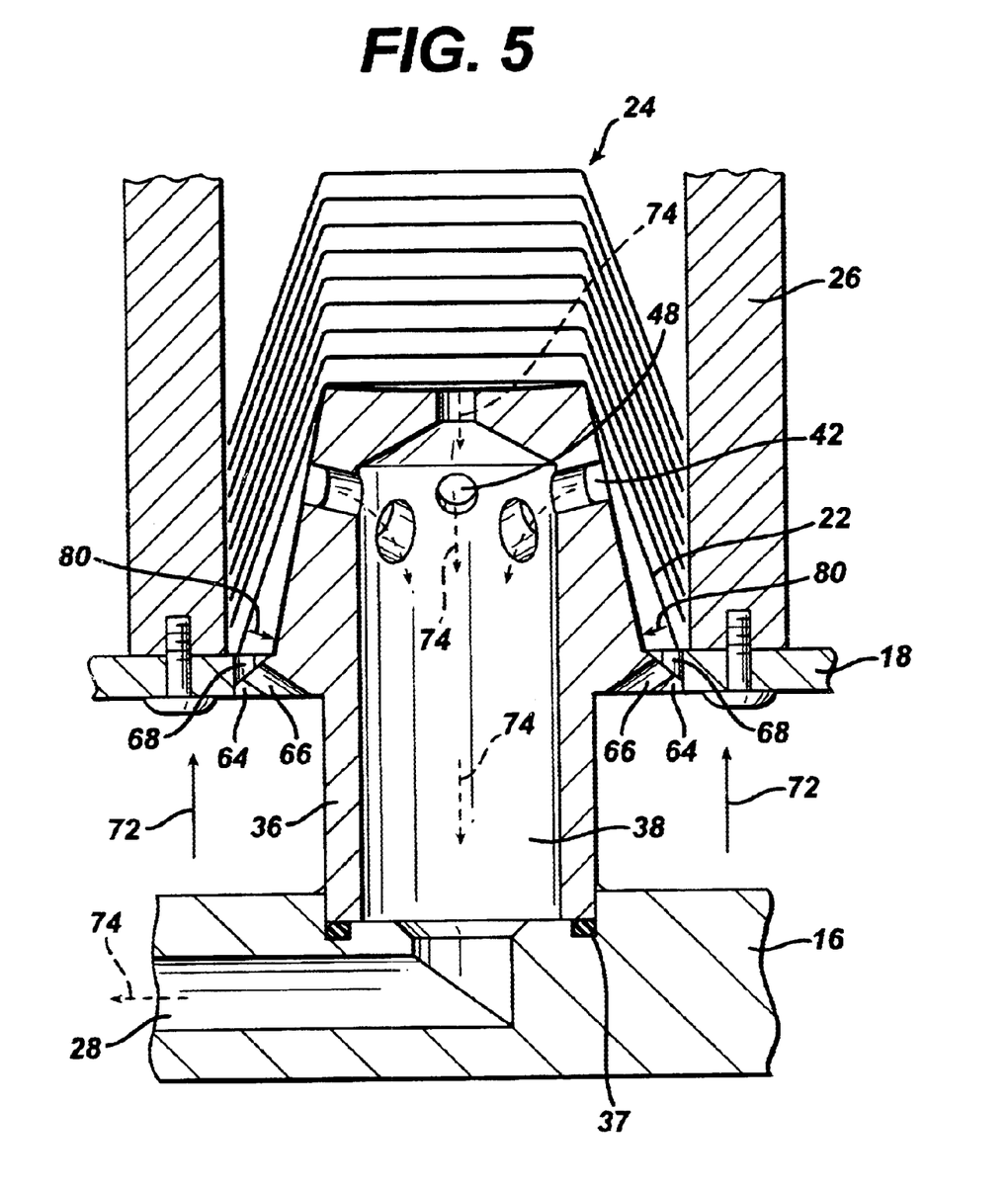
FIGS. 5–8 show in cross-section the vacuum picker apparatus of FIG. 4 operating through a sequence of a vacuum picking operation.

In FIG. 5, the support plate 16 for the picker head 14 is moved in the direction of arrow 72 to transport the picker head 14 through the feed aperture 20 in the base plate 18. As the picker head 14 proceeds to the feed aperture 20, a vacuum is generated at the picker head 14 and the vicinity thereof by withdrawing air through the picker head along the direction of arrows 74.

As the picker head 14 approaches the feed aperture 20, the air flow 74 becomes more concentrated until the protective ring 34 contacts an edge 76 (FIG. 1) of the feed aperture 20. The height of the upper portion 30 of the picker head is sized and shaped to the depth of the individual cup 22 so that the bottom 56 of the cup 22 only has to be drawn down a short amount to contact the top 50 of the picker head 14. Protruding regions 78 of the protective ring 34 are cut with an angle which is complementary to mate with the corresponding edge of the feed aperture 20. Similarly, the angle of the cutout 64 or notches in the protective ring 34 is designed to mate with the edge 76 at the ears 68 along the feed aperture 20.

As shown in FIG. 5, the upper portion 30 of the picker head 14 is completely inserted into the cup 22 so that vacuum holes 42,48,66 are positioned as close as possible to the inner surface of the cup 22 to draw the cup down onto the picker head 14. The cup 22 is drawn down onto the picker head 14 in the direction of arrows 80.

The picker head 14 stays in position within the cup 22 until either a timer or a sensor (not shown) determines that the cup 22 has been drawn completely down on the picker head 14.

Figure 6:
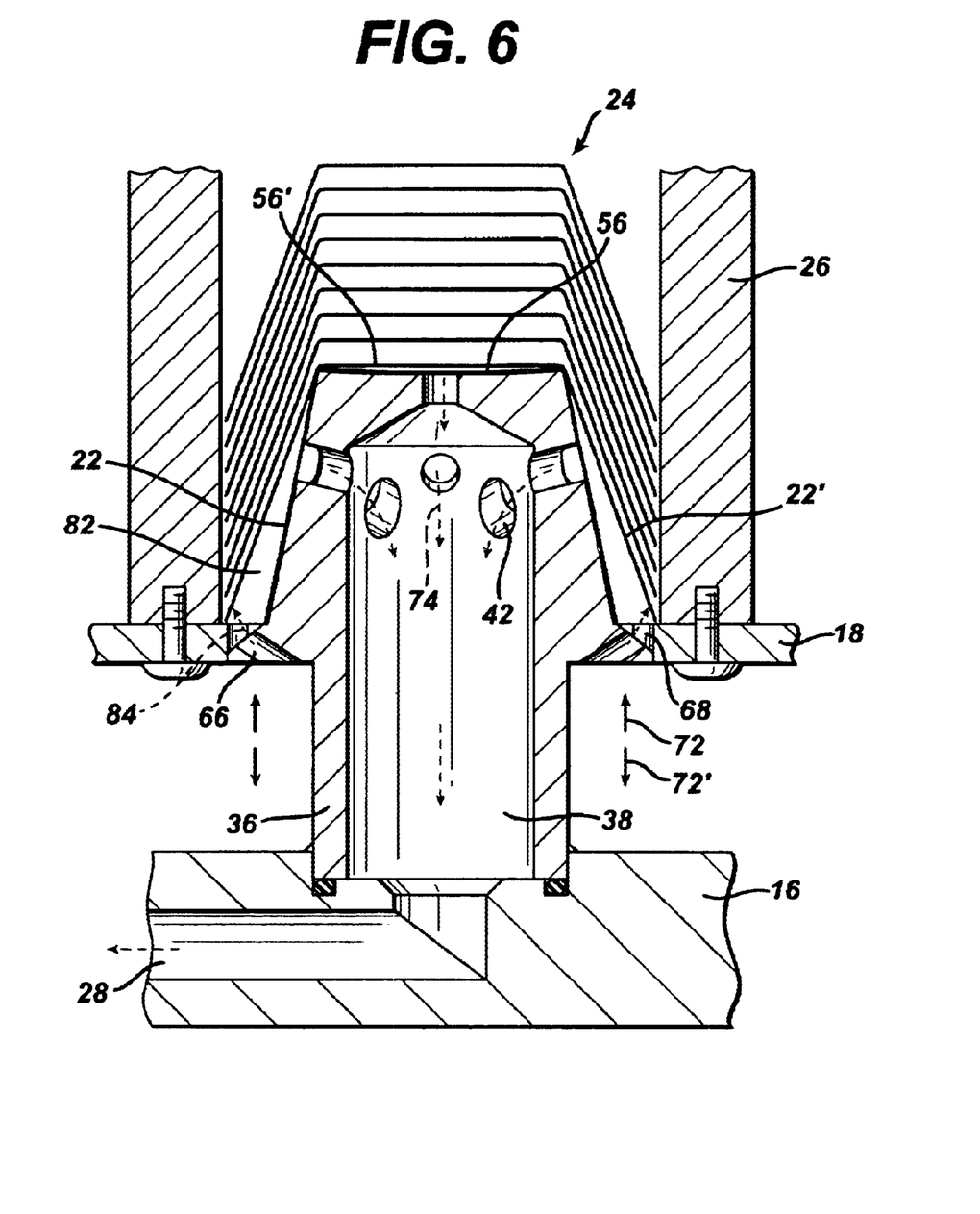
Figure 6A:
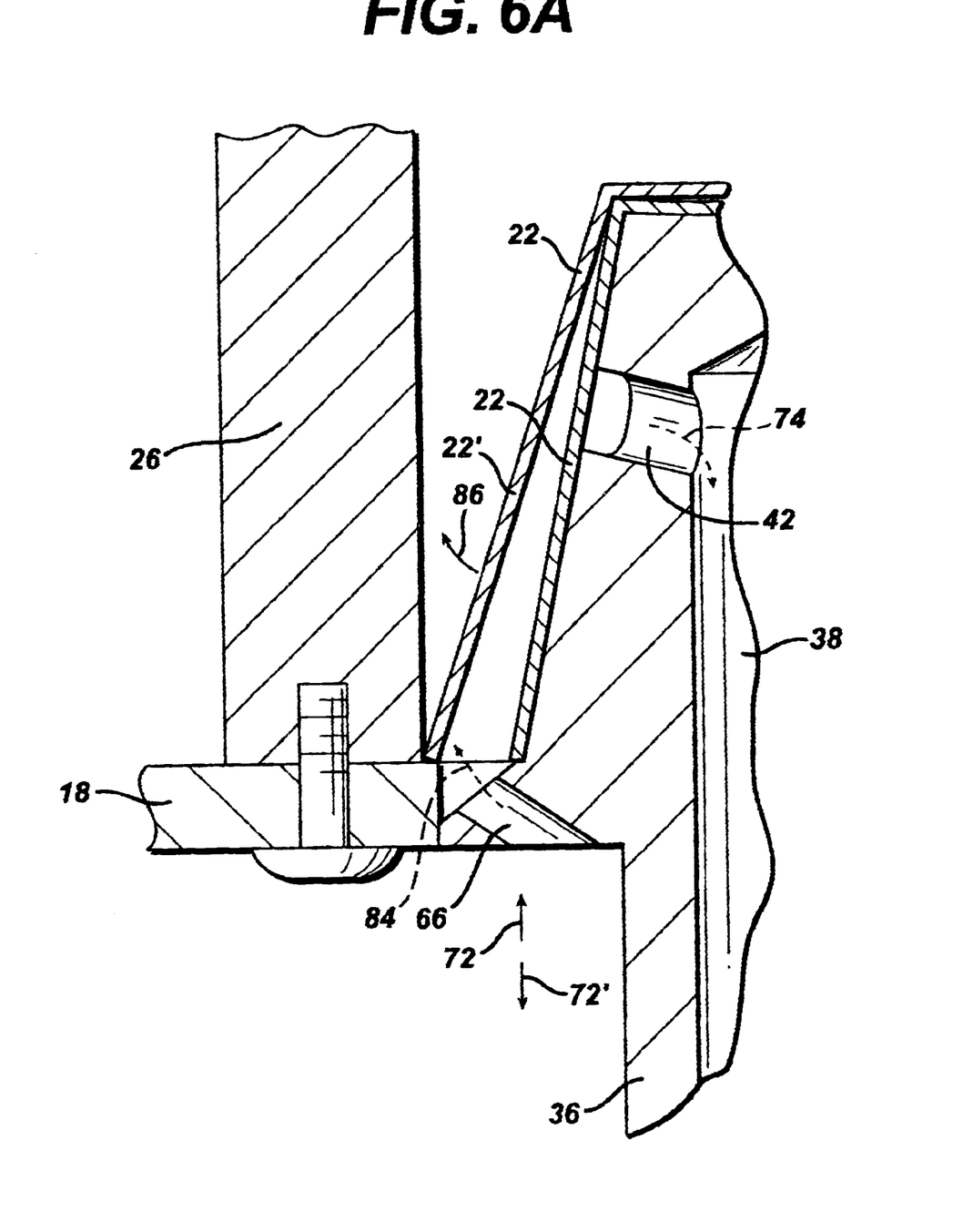

In FIG. 6, the cup 22 is drawn down onto the picker head 14, including the bottom 56 of the cup 22. The bottom 56 is slightly pulled away from the bottom 56' of the next succeeding cup 22' in the stack 24. As shown in FIGS. 6, 6A, the next cup 22' is slightly spaced from the cup 22 and supported on the ears 68 extending from the feed aperture 20. The cup 22 which has been drawn down under the effect of the vacuum onto the picker head 14 now rests on the protruding regions 78 of the ring 34. The cup 22 can now be withdrawn on the picker head and will clear the ears 68 at the feed aperture 20 while resting on the protective ring 34 as the cup 22 passes through the feed aperture 20.

Referring still to FIGS. 6, 6A, as the support plate 16 begins to withdraw the picker head 14 from the cup stack 24 in the direction of arrows 72', a small space 82 is provided between the cup 22 and the next cup 22' to be denested. At a brief moment as the picker head 14 is withdrawn from the base plate 18, and air is still being withdrawn through the picker head 14 shown generally by the broke arrow 74, the air remaining in the vicinity of the picker head 14 is drawn upward toward the protective ring 34 at the apertures 66 as shown by the arrows 84. Until the protective ring 34 completely clears the ears 68 and edge 76 of the feed aperture 20, the air in the vicinity of the picker head is drawn up through the apertures 66 through the space 82 between the cups 22, 22' so as to push the cup 22' and hence the stack 24 away from the cup 22 as indicated by the arrow 86, which cup 22 has adhered to the picker head 14. This manner of controlling the air flow provides a force to be exerted against the cup 22' of the stack 24 so that only the cup 22 can be withdrawn on the picker head 14 as it is withdrawn through the feed aperture 20.

Figure 7:
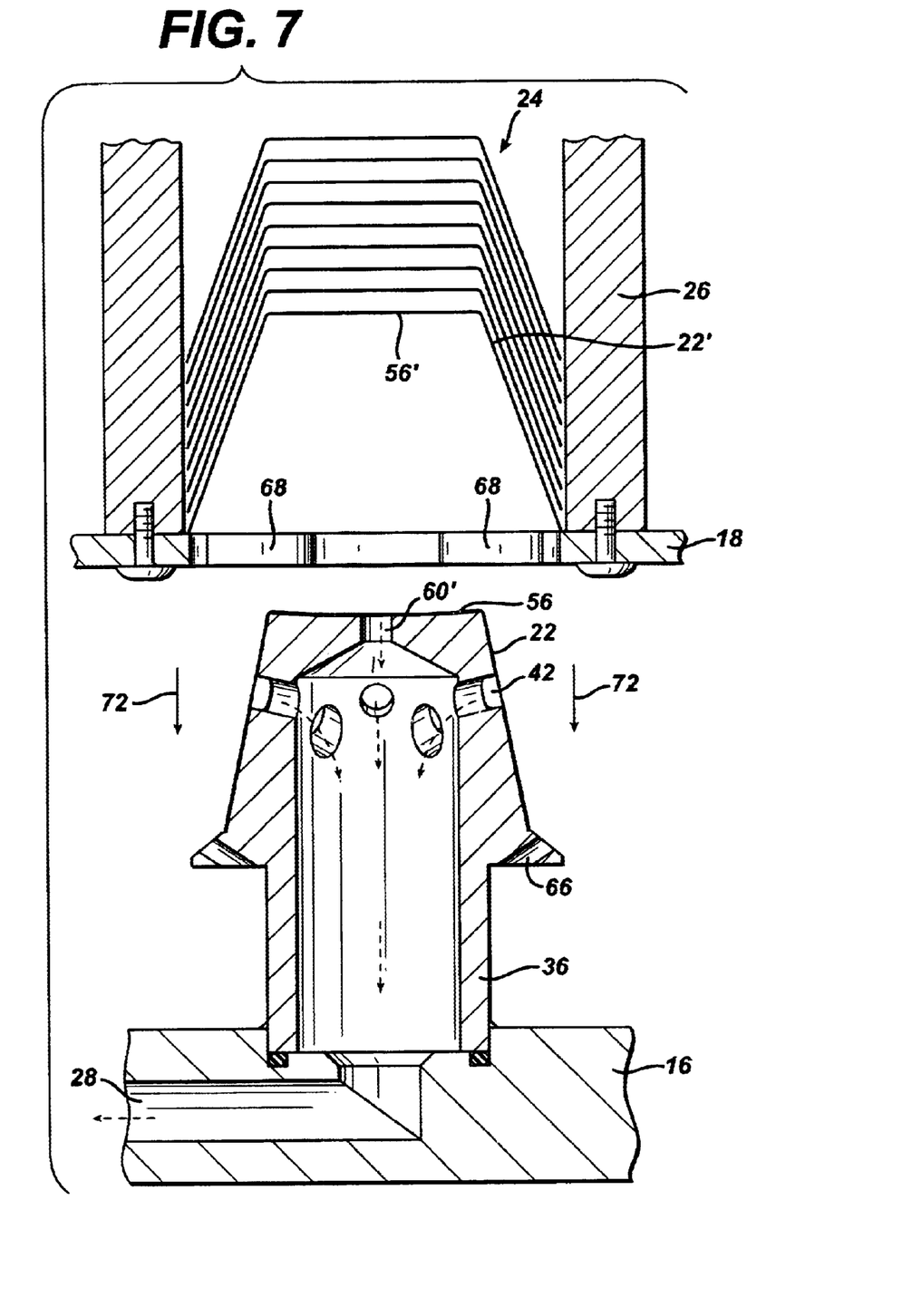

In FIG. 7, the cup 22 is shown held onto the picker head 14 which has been completely withdrawn from the base plate 18. The next cup 22' is in position on the base plate 18 with its open ended edge supported on the ears 68 at the feed aperture 20. During the next denesting operation, when the vacuum is applied, the cup 56' will be withdrawn down onto the picker head 14 thereby pulling the sidewall of the cup 22' onto the picker head so that it will clear the ears 68 of the base plate 18 thereby avoiding damage to the edge of the cup 22'.

Figure 8:
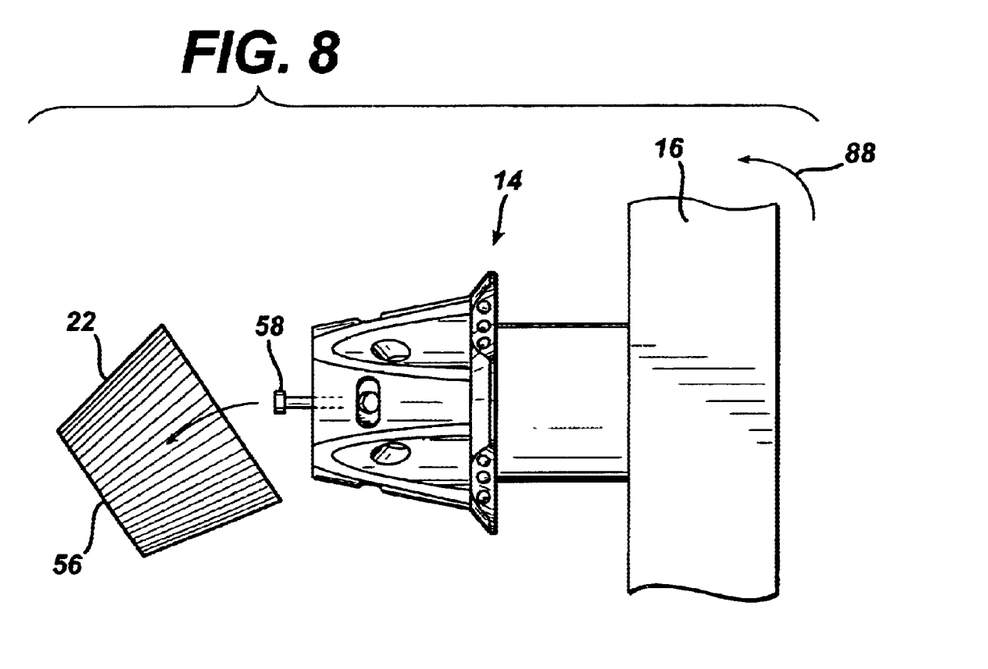

In FIG. 8, the support plate 16 has been fully retracted from the base plate 18 and is pivoted in the direction of arrow 88 to pivot the picker head 14 and urge the cup 22 off the picker head 14. On those occasions where the cup 22 is formed of an extremely light weight material, tilting of the picker head 14 automatically deploys the knock-out button 58 to impact the bottom 56 of the cup 22 and force it from the picker head where it lands with its open end upward to receive bakery dough or other comestible.

Figure 9:
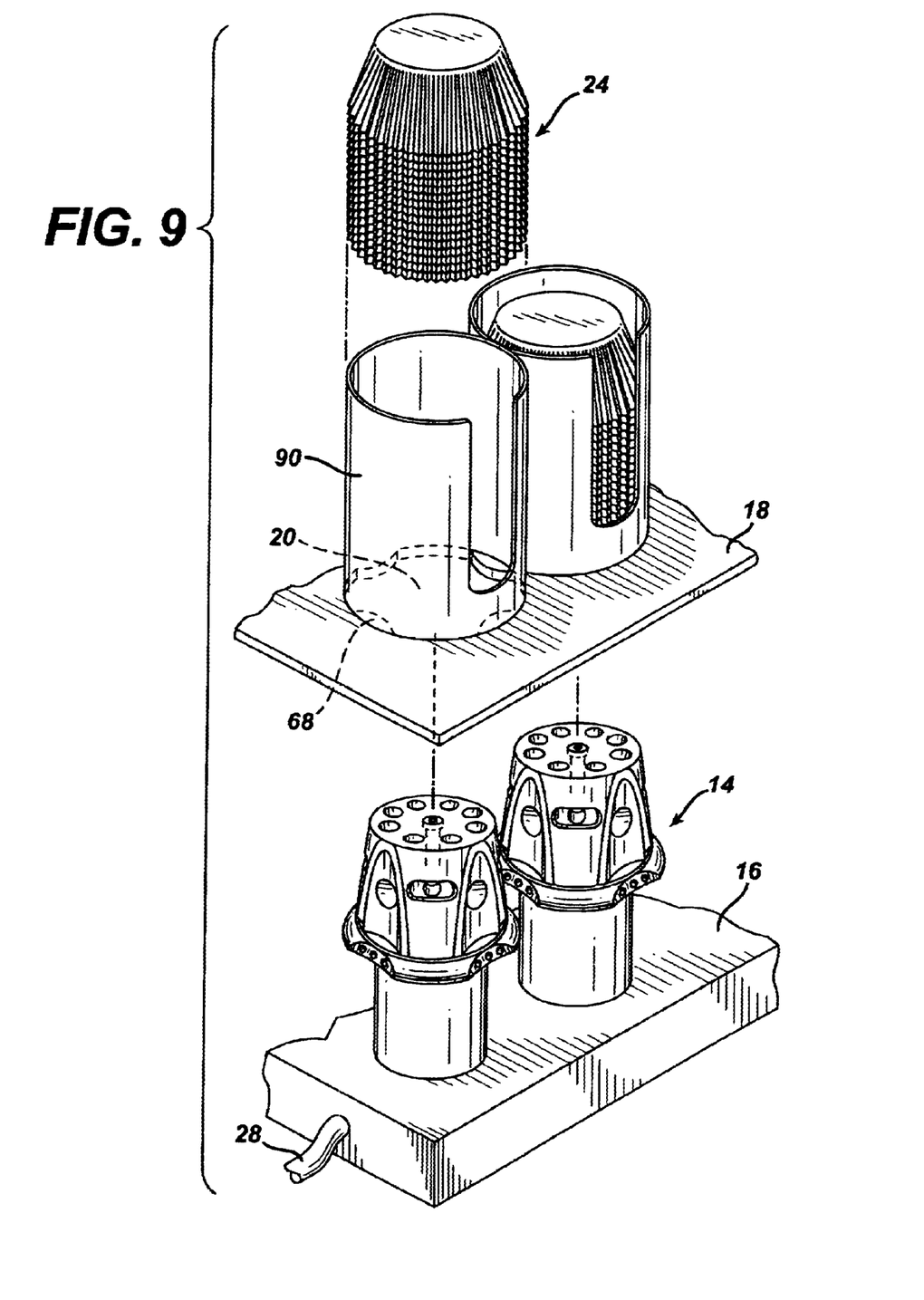
FIG. 9 shows the multiplicity of cups nested together and contained within sleeves for coaction with a corresponding number of the picker heads for a denesting operation.

In FIG. 9, the stack 24 of cups 22 can be transported to the vacuum picker apparatus 12 in a cylindrical sleeve 90. The sleeve 90 can have an exterior dimension sufficient to be retained by the upstanding lugs 26 on the base plate 18. Alternatively, the sleeves 90 can be attached to the base plate 18 and a stack 24 of cups can be deposited into the sleeve 90 over the feed aperture 20 for the denesting operation.

Figure 10:
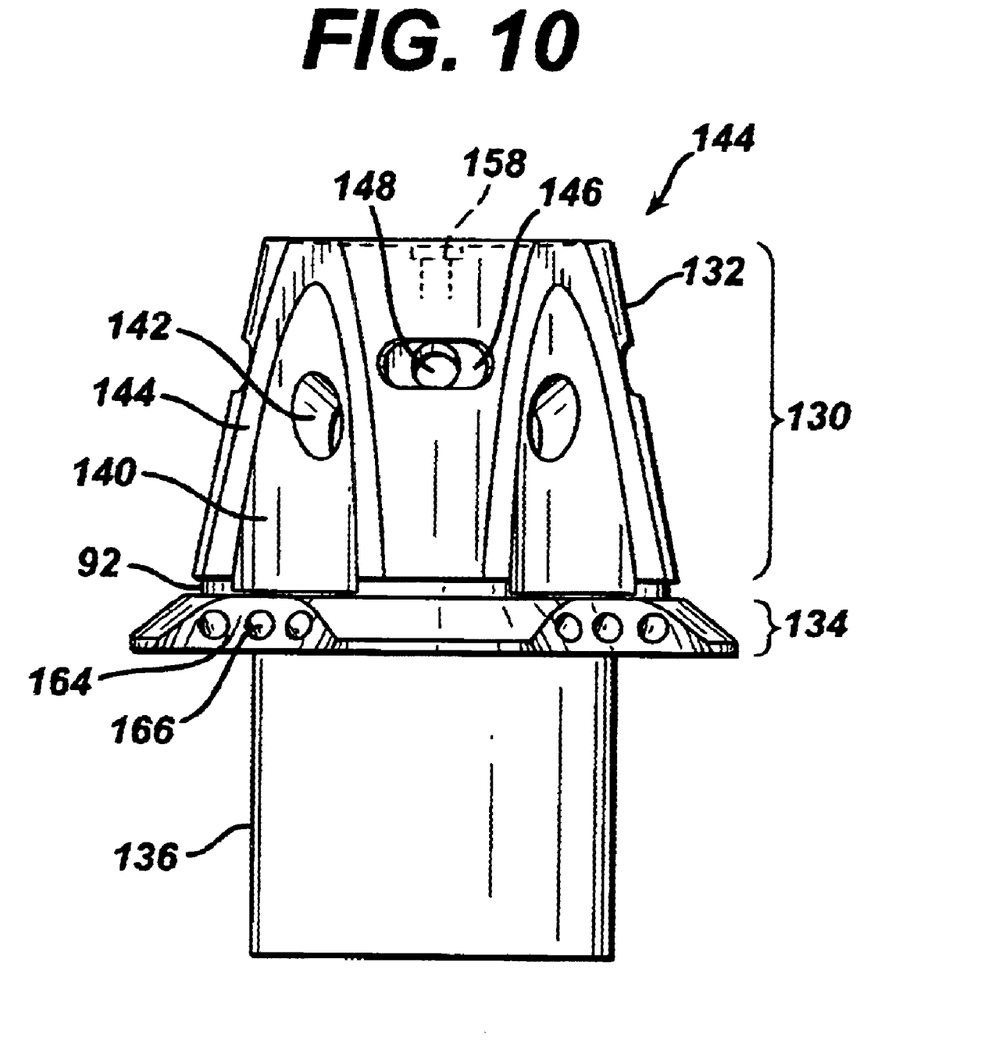
FIG. 10 shows a side elevation view of another preferred embodiment of a picker head for the vacuum apparatus according to the present invention.

FIG. 10 shows an alternate embodiment of a picker head 114 according to the present invention. Elements illustrated in FIG. 10 which correspond to the elements described above with respect to FIGS. 1–9 have been designated by corresponding reference numerals increased by 100, respectively. The embodiment of FIG. 10 is designed for use in the same manner as the embodiment of FIGS. 1–9, unless otherwise stated.

The picker head 114 includes a channel 92 which extends along the upper portion 130 where it meets the protective ring 134. The channel 92 is interrupted at the flats 140 so that it is only continuous along the sidewall 132 between the flats 140. The channel 90 relieves excessive air pressure during the vacuum action on the cup. The channel 92 functions as a baffle to restrict the air flow to the apertures 42,48,60 and thereby, reduce an abrupt collapsing effect on the cup 22 when the vacuum is established.

By way of example, the picker head 14 of the present invention as discussed above can be ganged as a plurality of picker heads for use with the base plate 18 having a corresponding number of feed apertures 20 over which corresponding cup stacks 24 are positioned for denesting.

The design of the picker head 14 allows for a more positive separation of one cup 22 from the next in the stack 24.

It will be understood that the embodiments disclosed herein are merely exemplary and that a person skilled in the art may make many variations and modifications without departing from the spirit and scope of the invention. All such modifications and variations are intended to be included within the scope of the invention as defined in the appended claims.

What is claimed is:

1. An apparatus for denesting a cup from a stack of cups, comprising:
   a base plate comprising:
      a feed aperture extending through the base plate,
      a plurality of ears formed in the base plate extending into the feed aperture, the plurality of ears arranged around the feed aperture to support the stack of cups at the feed aperture,
      a hollow cylindrical sleeve resting on the base plate in registration with the feed aperture for receiving the stack of cups,
      a plurality of upstanding lugs extending from the base plate at spaced intervals around the feed aperture for containing the cylindrical sleeve at the feed aperture;
   a vacuum picker head comprising:
      an upper portion having:
         a top,
         a bottom,
         a sidewall interconnecting the top and the bottom,
         a plurality of concave depressions in the sidewall extending substantially along a length of the upper portion at spaced intervals on the sidewall, a plurality of first vacuum holes, each one of the holes extending through the sidewall at a corresponding one of the concave depressions, a transition surface interconnecting each of the concave depressions with an adjacent portion of the sidewall, a plurality of elongated slots in the sidewall at spaced locations between the concave depressions, each one of the elongated slots arranged perpendicular to the top of the upper portion, a plurality of second vacuum holes, each one of the holes extending through the sidewall at a corresponding one of the elongated slots, a movable pin seated in the top of the upper portion and automatically extendable from the upper portion when the vacuum picker head is pivoted, a third vacuum hole extending through the movable pin, wherein each one of the vacuum holes is constructed and arranged to draw air into the vacuum picker head to pull a cup from the stack of cups onto the upper portion;

a protective ring extending outward from the bottom of the upper portion, the protective ring having:

a plurality of concave notches spaced apart along the ring, each one of the concave notches substantially in registration with a corresponding one of the plurality of concave depressions of the upper portion, a plurality of protruding portions alternatingly spaced between the plurality of concave notches for providing a plurality of steps upon which a cup can rest when the cup is withdrawn from the ears at the feed aperture of the base plate, at least one air passage extending through the protective ring at each of the concave notches for directing air from below the protective ring to a space between the cup being denested and the stack of cups to force the stack of cups away from the denested cup;

a column extending from the protective ring opposite to the upper portion for supporting the vacuum picker head;

a central air passage extending through the vacuum picker head and in communication with the plurality of first vacuum holes, the plurality of second vacuum holes and the third vacuum hole; and a support plate for supporting the column, the support plate having a vacuum hose extending therethrough and in communication with the central air passage for drawing air from the vicinity of the vacuum picker head into the central air passage;

wherein air displaced in the vicinity of the picker head provides a vacuum and draws a cup from the stack off the ears at the feed aperture onto the picker head, and forces the stack to remain at the base plate as the cup is withdrawn through the feed aperture and from the base plate.

2. An apparatus for denesting a cup from a stack of cups, comprising:

feeder means for supporting the stack of cups; and air displacement means for displacing air to draw a vacuum to denest the cup from the stack of cups and draw the cup away from the feeder means, and for displacing air to contact the stack of cups to force the stack of cups to remain at the feeder means; and transport means for transporting the air displacement means to coact with the feeder means to denest a cup from the stack of cups in the feeder means.

3. The apparatus according to claim 2, further comprising:

ejection means mounted to the air displacement means for ejecting the cup from the air displacement means.

4. The apparatus according to claim 3, wherein the ejection means comprises:

a pin mounted to the air displacement means for movement with respect to the air displacement means to exert a force against the cup to be removed from the air displacement means.

5. The apparatus according to claim 2, wherein the feeder means comprises:

a first plate having a feed aperture extending therethrough, the feed aperture constructed and arranged for coaction with the air displacement means for displacing air to draw a vacuum at the cup and to contact the stack of cups with a force of air.

6. The apparatus according to claim 5, further comprising:

retainer means at the first plate for retaining the stack of cups at the feed aperture for denesting.

7. The apparatus according to claim 6, wherein the retainer means comprises at least one ear formed in the first plate extending into the feed aperture for supporting the stack of cups at the feed aperture when the cup is being denested.

8. The apparatus according to claim 6, further comprising:

containment means mounted to the first plate for containing the stack of cups at the feed aperture for denesting.

9. The apparatus according to claim 8, wherein the containment means comprises:

a plurality of elongated members extending from the first plate at the feed aperture for containing the stack of cups at the feed aperture.

10. The apparatus according to claim 2, wherein the air displacement means comprises:

first air displacement means for displacing air to draw the vacuum to denest the cup from the stack of cups and draw the cup away from the feeder means, and second air displacement means for displacing air to contact the stack of cups to force the stack of cups to remain at the feeder means.

11. The apparatus according to claim 10, wherein the first air displacement means comprises:

first air passage means extending through the first air displacement means and through which air is displaced to draw a vacuum in the vicinity of the first air displacement means and denest the cup from the stack of cups onto the first air displacement means.

12. The apparatus according to claim 11, wherein the second air displacement means comprises:

a protective ring mounted to the first air displacement means for coaction therewith, the protection ring comprising:

a plurality of spaced apart notched regions, at least one aperture extending through each one of the plurality of notched regions for directing air to contact the stack of cups to remain at the feeder means, and a plurality of protruding regions spaced apart at intervals between the plurality of notches;

wherein the plurality of protruding regions support the cup when it is drawn to the first air displacement means.

13. The apparatus according to claim 11, further comprising:

depression means formed in the first air displacement means and into which a cup is drawn during a denesting operation.

14. The apparatus according to claim 13, wherein the depression means comprises:

a plurality of concave depressions spaced apart for coaction with the first air passage means.

15. A vacuum picker device for denesting a cup from a stack of cups, comprising:

a vacuum picker head comprising:
an upper portion having:
a top,
a bottom,
a sidewall interconnecting the top and the bottom,
a plurality of concave depressions in the sidewall extending substantially along a length of the upper portion at spaced intervals on the sidewall,
a plurality of first vacuum holes, each one of the holes extending through the sidewall at a corresponding one of the concave depressions,
a transition surface interconnecting each of the concave depressions with an adjacent portion of the sidewall,
a plurality of elongated slots in the sidewall at spaced locations between the concave depressions, each one of the elongated slots arranged perpendicular to the top of the upper portion,
a plurality of second vacuum holes, each one of the holes extending through the
sidewall at a corresponding one of the elongated slots,
a movable pin seated in the top of the upper portion and automatically extendable from the upper portion when the vacuum picker head is pivoted,
a third vacuum hole extending through the movable pin,
wherein each one of the vacuum holes is constructed and arranged to draw air into the vacuum picker head to pull a cup from the stack of cups onto the upper portion;
a protective ring extending outward from the bottom of the upper portion, the protective ring having:
a plurality of concave notches spaced apart along the ring, each one of the concave notches substantially in registration with a corresponding one of the plurality of concave depressions of the upper portion,
a plurality of protruding portions alternatingly spaced between the plurality of concave notches for providing a plurality of steps upon which a cup can rest when the cup is withdrawn from the ears at the feed aperture of the base plate,
at least one air passage extending through the protective ring at each of the concave notches for directing air from below the protective ring to a space between the cup being denested and the stack of cups to force the stack of cups away from the denested cup;
a column extending from the protective ring opposite to the upper portion for supporting the vacuum picker head;
a central air passage extending through the vacuum picker head and in communication with the plurality of first vacuum holes, the plurality of second vacuum holes and the third vacuum hole; and
a support plate for supporting the column, the support plate having a vacuum hose extending therethrough and in communication with the central air passage for drawing air from the vicinity of the vacuum picker head into the central air passage;
wherein air displacement in the vicinity of the picker head denests a cup from the stack to be drawn onto the picker head and exerts a force to urge the stack away from the picker head for withdrawal of the denested cup with the picker head.

16. A vacuum picker device for denesting a cup from a stack of a plurality of cups, comprising:

a movable picker head, comprising:
first means for displacing air at the picker head to draw the cup away from the stack to the picker head; and
second means for displacing air at the picker head to force the stack away from the cup being drawn to the picker head;
wherein said first and second means for displacing air are disposed in fixed positions on said picker head.

17. The vacuum picker device according to claim 16, wherein the first air displacement means comprises:

at least one concave depression in the picker head; and
a first air passage extending through the picker head to the concave depression for drawing the cup into the concave depression.

18. A vacuum picker device for denesting a cup from a stack of a plurality of cups, comprising:

a body portion, comprising:
first means for displacing air at the body portion to draw the cup away from the stack to the body portion, wherein the first air displacement means comprises:
at least one concave depression in the body portion; and
a first air passage extending through the body portion to the concave depression for drawing the cup into the concave depression;
second means for displacing air at the body portion to force the stack away from the cup being drawn to the body portion;
an elongated slot formed in the body portion adjacent to the concave depression, and
a second air passage extending through the elongated slot into the body portion for communication with the first air passage.

19. The device according to claim 18 wherein the second air displacing means comprises:

a protective ring mounted to the first air displacing means, the protective ring comprising:
at least one notched region, and
a third air passage extending through the notched region, the third air passage permitting the flow of displaced air from the protective ring to an area in the vicinity of the concave depression to impact the stack of cups.

20. A vacuum picker device for denesting a cup from a stack of a plurality of cups, comprising:

a body portion, comprising:
first means for displacing air at the body portion to draw the cup away from the stack to the body portion; and
second means for displacing air at the body portion to force the stack away from the cup being drawn to the body portion; and
ejection means mounted to the body portion, the ejection means constructed and arranged for movement between a first position wherein the ejection means is retained at the body portion, and a second position wherein the ejection means extends from the body portion to eject the cup disposed on the body portion.

21. A method of denesting a cup from a stack of a plurality of cups, the method comprising the steps of:
   positioning the stack of cups with their respective open ends facing downward;
   aligning the stack of cups in a vertical orientation for denesting;
   supporting the stack of cups over an aperture in a support means and through which individual cups from the stack will be withdrawn for denesting;
   positioning a vacuum picker head beneath the support means and in registration with the aperture;
   transporting the vacuum picker head to the aperture in the support means;
   drawing air from an exterior of the vacuum picker head into an interior of the vacuum picker head;
   inserting the vacuum picker head through the aperture into the open end of the lower most one of the cups in the stack of cups;
   substantially sealing a space between the vacuum picker head, the lower most cup and the support means;
   evacuating air from the space into the vacuum picker head for providing a vacuum in the space;
   denesting the lower most cup from the stack of cups;
   drawing the denested cup onto the vacuum picker head;
   supporting the denested cup on the vacuum picker head;
   withdrawing the vacuum picker head from the aperture in the support means;
   directing a burst of air against the stack of cups to force the stack away from the denested cup for the stack to remain at the support means;
   transporting the vacuum picker head with the denested cup thereon away from the support means;
   pivoting the vacuum picker head; and
   ejecting the denested cup from the vacuum picker head for further processing.

22. A method of removing a cup from a stack of a plurality of cups, the method comprising the steps of:
   inserting an air displacement member into an open end of a lower most one of the cups in the stack of cups;
   displacing air in the vicinity of the air displacement member for providing a vacuum; removing a lower most cup from the stack of cups;
   supporting the removed cup on the air displacement member; and
   displacing air from the air displacement member against the stack of cups to force the stack away from the removed cup.

23. The method according to claim 22, wherein the step of supporting the removed cup includes the step of:
   withdrawing the air displacement member from the stack of cups.

24. A method of removing a cup from a stack of a plurality of cups, the method comprising the steps of:
   inserting an air displacement member into an open end of a lower most one of the cups in the stack of cups;
   displacing air in the vicinity of the air displacement member for providing a vacuum;
   removing a lower most cup from the stack of cups;
   supporting the removed cup on the air displacement member, wherein the step of supporting the removed cup includes the step of withdrawing the air displacement member from the stack of cups;
   displacing air against the stack of cups to force the stack away from the removed cup; and
   pivoting the air displacement member to remove the cup supported on the air displacement member.

25. The method according to claim 24, further comprising the step of:
   ejecting the cup from the air displacement member.

* * * * *